(12) United States Patent
Viswanathan et al.

(10) Patent No.: US 11,381,950 B2
(45) Date of Patent: Jul. 5, 2022

(54) IN-VEHICLE DETECTION OF A CHARGE-ONLY CONNECTION WITH A MOBILE COMPUTING DEVICE

(71) Applicant: Google LLC, Mountain View, CA (US)

(72) Inventors: Sriram Viswanathan, Bothell, WA (US); Lukasz Pawel Krakowiak, Duvall, WA (US); Dan Feng, Bellevue, WA (US); Eugene Koh, Kirkland, WA (US)

(73) Assignee: Google LLC, Mountain View, CA (US)

( * ) Notice: Subject to any disclaimer, the term of this patent is extended or adjusted under 35 U.S.C. 154(b) by 447 days.

(21) Appl. No.: 16/716,702

(22) Filed: Dec. 17, 2019

(65) Prior Publication Data

US 2021/0185500 A1    Jun. 17, 2021

(51) Int. Cl.
*H04W 4/80* (2018.01)
*H04W 4/48* (2018.01)
(Continued)

(52) U.S. Cl.
CPC ............. *H04W 4/80* (2018.02); *H02J 7/0036* (2013.01); *H04M 1/72412* (2021.01); *H04W 4/48* (2018.02); *H02J 2207/30* (2020.01)

(58) Field of Classification Search
CPC ......... H04W 4/80; H04W 4/48; H02J 7/0036; H02J 2207/30; H02J 7/00034;
(Continued)

(56) References Cited

U.S. PATENT DOCUMENTS

2010/0305807 A1   12/2010 Basir et al.
2014/0066132 A1    3/2014 Burke et al.
(Continued)

FOREIGN PATENT DOCUMENTS

| JP | 2010239283 A | 10/2010 |
|---|---|---|
| JP | 2015520875 A | 7/2015 |
| JP | 2015148831 A | 8/2015 |
| JP | 2015162795 A | 9/2015 |

(Continued)

OTHER PUBLICATIONS

Extended Search Report from counterpart European Application No. 20177193.8, dated Nov. 10, 2020, 8 pp.

(Continued)

*Primary Examiner* — Peter P Chau
(74) *Attorney, Agent, or Firm* — Shumaker & Sieffert, P.A.

(57) ABSTRACT

An example method includes identifying, by a mobile computing device, short-range wireless communication signals that are associated with a vehicle computing system; determining, by the mobile computing device, based on the short-range wireless communication signals, that the mobile computing device is proximate to the vehicle computing system; identifying, by the mobile computing device, an electrical connection between the mobile computing device and the vehicle, wherein the electrical connection is provided by an electrical cable that connects a port of the mobile computing device to a port of the vehicle; determining, by the mobile computing device, that the electrical connection is a charge-only connection, wherein the charge-only connection enables an electrical charging or discharging of the mobile computing device but prohibits any data transfer between the mobile computing device and the vehicle computing system; and outputting, by the mobile computing device, a notification indicative of the charge-only connection.

20 Claims, 6 Drawing Sheets

(51) Int. Cl.
*H04M 1/72412* (2021.01)
*H02J 7/00* (2006.01)

(58) Field of Classification Search
CPC ...... H02J 7/00045; H02J 7/0047; H02J 7/007; H04M 1/72412; G06F 1/26; G06F 3/0488; G06F 3/04883; G06F 13/4068; G06F 13/38; G06F 3/14; G07C 2209/63; B60R 16/02; H04B 5/0031; H04B 5/0037
See application file for complete search history.

(56) References Cited

U.S. PATENT DOCUMENTS

| | | |
|---|---|---|
| 2014/0163774 A1 | 6/2014 | Demeniuk |
| 2014/0170602 A1 | 6/2014 | Reed |
| 2015/0142993 A1 | 5/2015 | Blanc et al. |
| 2015/0148989 A1 | 5/2015 | Cooper et al. |
| 2015/0371459 A1 | 12/2015 | Doughty et al. |
| 2016/0226713 A1 | 8/2016 | Dellinger et al. |
| 2016/0227009 A1 | 8/2016 | Kim et al. |
| 2018/0181212 A1 | 6/2018 | Miyazawa |
| 2019/0280514 A1 | 9/2019 | Ramirez Lluvias |
| 2019/0334782 A1* | 10/2019 | Dellinger ............ H04W 52/028 |
| 2021/0173532 A1* | 6/2021 | Van der Keere ..... G06F 3/0488 |

FOREIGN PATENT DOCUMENTS

| | | |
|---|---|---|
| JP | 2017509171 A | 3/2017 |
| JP | 2018106683 A | 7/2018 |
| WO | 2011016879 A1 | 2/2011 |
| WO | 2018032349 A1 | 2/2018 |

OTHER PUBLICATIONS

Examination Report from counterpart Indian Application No. 202044023344, dated Nov. 9, 2021, 6 pp.
Response to Extended Search Report dated Nov. 10, 2020, from counterpad European Application No. 20177193.8, filed Nov. 1, 2021, 21 pp.
Office Action, and translation thereof, from counterpart Korean Application No. 10-2020-0077000 dated Dec. 3, 2021, 12 pp.
Response to First Examination Report dated Nov. 9, 2021, from counterpart Indian Application No. 202044023344 filed Dec. 20, 2021, 38 pp.
Notice of Reasons for Refusal, and translation thereof, from counterpart Japanese Application No. 2020-095192, dated Jul. 27, 2021, 13 pp.
Notice of Allowance from counterpart Korean Application No. 10-2020-0077000 dated Mar. 8, 2022, 3 pp.
Office Action from counterpart Japanese Application No. 2020-095192 dated Mar. 4, 2022, 6 pp.
Response to Office Action dated Dec. 3, 2021, from counterpart Korean Application 10-2020-0077000, filed Jan. 28, 2022, 39 pp.

* cited by examiner

```
SHORT-RANGE WIRELESS CONNECTION TO
CAR ESTABLISHED!

SUGGESTED ACTION:

ATTACH CABLE FROM THE USB PORT ON THE
SMARTPHONE AND TO A USB PORT ON THE
CAR
```

FIG. 5A

```
ERROR!
 CHARGE-ONLY CONNECTION DETECTED!
 UNABLE TO ESTABLISH DATA CONNECTION
 WITH CAR

SUGGESTED ACTION(S):

1. PLUG CABLE INTO A DIFFERENT USB PORT
 ON THE CAR, AND/OR

2. TRY USING A DIFFERENT CABLE
```

FIG. 5B

IN-VEHICLE DETECTION OF A CHARGE-ONLY CONNECTION WITH A MOBILE COMPUTING DEVICE

BACKGROUND

Vehicles, such as automobiles, motorcycles, aircraft, and watercraft, may include one or more computing systems for performing functions and providing occupants with information, entertainment, assistance, and/or environmental control. For instance, an automobile may include an entertainment system for providing entertainment content, a navigation system for providing information and navigational assistance, a temperature control system for heating or cooling the in-vehicle cabin, a control system for adjusting various components or features of the automobile (e.g., a sun roof or window shades), or an "infotainment system" that performs some or all of these aforesaid functions. Modern vehicles are often equipped with an infotainment head unit (IHU) having a display device (e.g., presence-sensitive display) and compute engine, which is configured to execute an operating system and one or more applications. In many cases, vehicle operators may also have one or more mobile computing devices (e.g., smartphones or smartwatches), and these devices may establish one or more wired or wireless connections with the IHU once the operators are situated inside the vehicle.

SUMMARY

In general, the present application describes techniques for detecting the proximity of a mobile computing device (e.g., smartphone) to, e.g., a vehicle, and for further determining whether the mobile computing device has established a charge-only connection, via an electrical cable, with the vehicle (e.g., with the vehicle computing system of the vehicle). A charge-only connection may, in various cases, only enable electrical charging or discharging of the mobile computing device (e.g., by way of transferring electrical energy or power via a cable). As one example, once a user has entered the vehicle, the user's mobile computing device may determine that it is located within or in proximity to the vehicle based on detected short-range wireless communication signals that are associated with the vehicle computing system. In many cases, the user may wish to connect the mobile computing device with the vehicle, via an electrical cable, in order for the mobile computing device to establish a data connection with the vehicle computing system (e.g., in order to transfer application data for display at the vehicle computing system). If the user connects the electrical cable from a port (e.g., Universal Serial Bus port) of the mobile computing device to a port of the vehicle, the mobile computing device may be configured to monitor the status of its port and/or the electrical connection to determine if the mobile computing device has established a charge-only connection, rather than a full data connection with the vehicle computing system. In this case, the mobile computing device may output an error message, and may also output a recommendation that the user use a different type of cable that supports data communication, and/or that the user attach the current cable into a different port of the vehicle computing system. In such fashion, the techniques disclosed herein may enable more accurate and reliable determination as to when an established connection between the mobile computing device and the vehicle is a charge-only connection, rather than a data connection with the vehicle computing system. In certain other examples, the mobile computing device may be able to detect a charge-only connection, rather than a full data connection, with devices other than vehicles, such as with one or more devices in a peer-to-peer communications network, where the mobile computing device comprises one of the peer devices or nodes.

In one example, a method includes identifying, by a mobile computing device, one or more short-range wireless communication signals that are associated with a vehicle computing system of a vehicle, determining, by the mobile computing device, based on the one or more short-range wireless communication signals, that the mobile computing device is proximate to the vehicle computing system, and, responsive to determining that the mobile computing device is proximate to the vehicle computing system, identifying, by the mobile computing device, an electrical connection between the mobile computing device and the vehicle, wherein the electrical connection is provided by an electrical cable that connects a port of the mobile computing device to a port of the vehicle. The example method further includes determining, by the mobile computing device, whether the electrical connection is a charge-only connection, wherein the charge-only connection enables an electrical charging or discharging of the mobile computing device but prohibits any data transfer between the mobile computing device and the vehicle computing system, and, responsive to determining that the electrical connection is the charge-only connection, outputting, by the mobile computing device, a notification indicative of the charge-only connection.

In another example, a mobile computing device includes at least one processor and at least one computer-readable storage device. The at least one computer-readable storage device store instructions that, when executed by the at least one processor, cause the at least one processor to: identify one or more short-range wireless communication signals that are associated with a vehicle computing system of a vehicle; determine, based on the one or more short-range wireless communication signals, that the mobile computing device is proximate to the vehicle computing system; responsive to determining that the mobile computing device is proximate to the vehicle computing system, identify an electrical connection between the mobile computing device and the vehicle, wherein the electrical connection is provided by an electrical cable that connects a port of the mobile computing device to a port of the vehicle; determine whether the electrical connection is a charge-only connection, wherein the charge-only connection enables an electrical charging or discharging of the mobile computing device but prohibits any data transfer between the mobile computing device and the vehicle computing system; and, responsive to determining that the electrical connection is the charge-only connection, output a notification indicative of the charge-only connection.

In another example, a computer-readable storage medium stores instructions that, when executed, cause at least one processor of a mobile computing device to perform operations comprising: identifying one or more short-range wireless communication signals that are associated with a vehicle computing system of a vehicle; determining, based on the one or more short-range wireless communication signals, that the mobile computing device is proximate to the vehicle computing system; responsive to determining that the mobile computing device is proximate to the vehicle computing system, identifying an electrical connection between the mobile computing device and the vehicle, wherein the electrical connection is provided by an electrical cable that connects a port of the mobile computing device to a port of the vehicle; determining whether the electrical connection is a charge-only connection, wherein the charge-only connection enables an electrical charging or discharging of the mobile computing device but prohibits any data transfer between the mobile computing device and the vehicle computing system; and, responsive to determining that the electrical connection is the charge-only connection, outputting a notification indicative of the charge-only connection.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 5A-5B are screen diagrams illustrating example displays that may be output by a mobile computing device and/or a vehicle computing system, in accordance with one or more aspects of the present disclosure.

DETAILED DESCRIPTION

Figure 1:
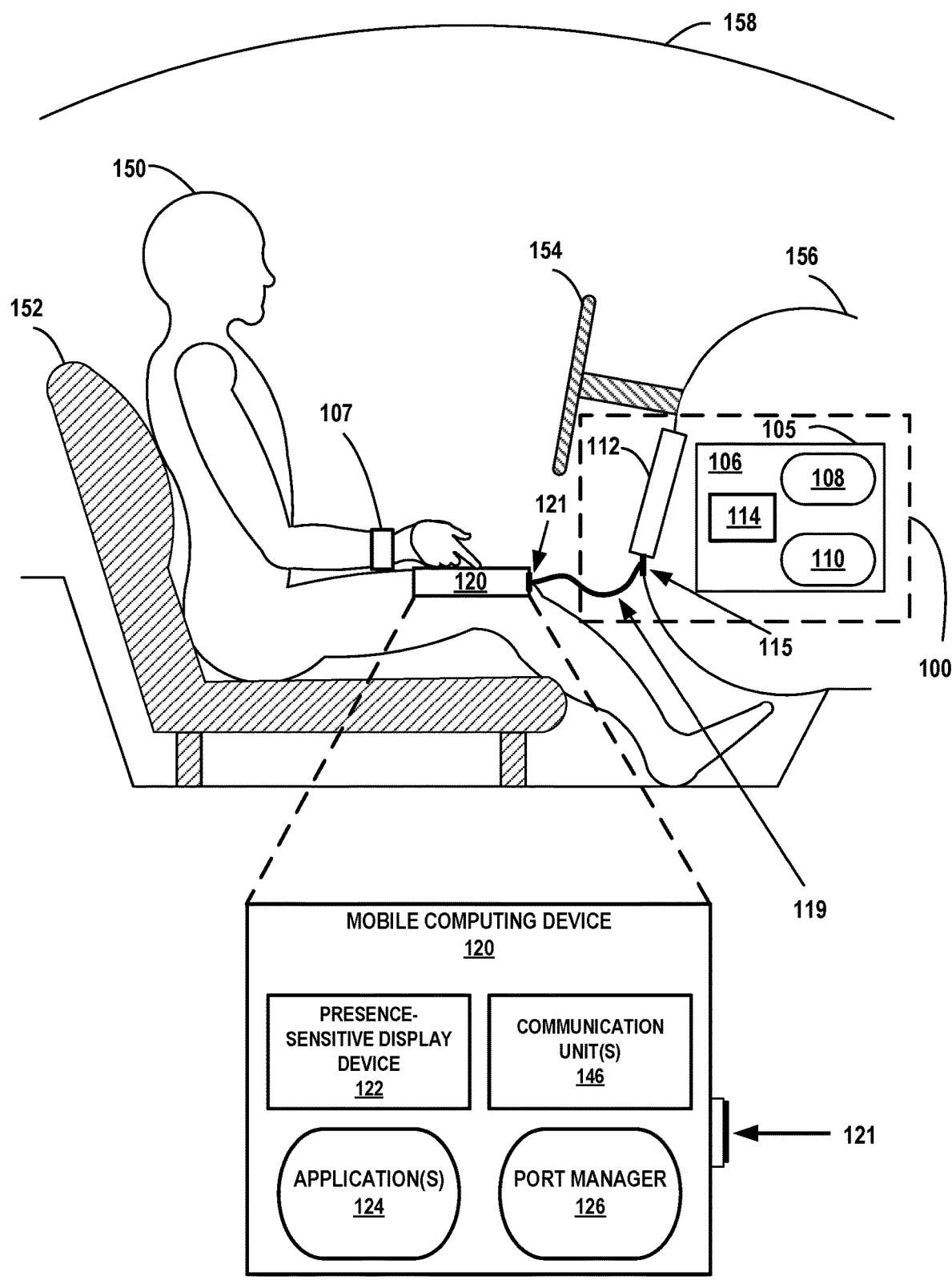
FIG. 1 is a conceptual diagram illustrating a side view of an interior of a vehicle in which an example mobile computing device is configured to detect a charge-only connection with an example vehicle computing system, in accordance with one or more aspects of the present disclosure.

FIG. 1 is a conceptual diagram illustrating a side view of an interior of a vehicle in which an example mobile computing device 120 is configured to detect a charge-only connection with an example vehicle computing system 100, in accordance with one or more aspects of the present disclosure. The vehicle illustrated in FIG. 1 may be an automobile, but aspects of the present disclosure may also be applicable to other types of vehicles, including trucks, motorcycles, aircraft, watercraft, trains, or other vehicles. In FIG. 1, a user 150 may normally occupy seat 152. In other cases, user 150 may occupy any other seat of the vehicle. Seat 152 of the automobile may be positioned directly behind steering wheel 154 of the vehicle such that an occupant of seat 152 may physically control steering wheel 154. The seat 152 may be positioned within the vehicle illustrated in FIG. 1 under roof 158. Steering wheel 154 may protrude from dashboard 156. At least one front passenger seat may be laterally positioned adjacent to seat 152. Other passenger seats may be positioned behind seat 152 or in front of seat 152.

Also shown in FIG. 1 is a collection of devices, components, and modules that may each be included in vehicle computing system 100. As noted above, modern vehicles are equipped with a vehicle computing system 100, such as an infotainment head unit (IHU) having a display device (e.g., presence-sensitive display device) 112. Vehicle computing system 100 is configured to execute an operating system and one or more applications, and enables user 150 to have a rich, personalized experience while driving, such as by listening to preferred music, browsing emails, or picking favored and/or frequent destinations, to name only a few examples. However, in various cases, in order to obtain such functionality via vehicle computing system 100, user 150 may often wish to use mobile computing device 120 to establish a data connection with vehicle computing system 100 (e.g., for transferring application data that may be displayed at display device 112). In these cases, vehicle computing system 100 may not have any cellular connectivity or access to certain data that is stored or otherwise provided by mobile computing device 120. Mobile computing device 120 may have cellular connectivity, and may be configured to provide various different forms of data (e.g., data received wirelessly from external servers, data associated with one or more applications) to vehicle computing system 100 via one or more data connections (e.g., for display of such data), such as one or more wired or wireless data connections that enable data communication with vehicle computing system 100. However, as will be described in further detail below, if user 150 attaches an electrical cable 119 to both mobile computing device 120 and vehicle computing system 100 in an effort to establish a data connection for such purposes, mobile computing device 120 is configured to determine if the established connection is a charge-only connection that does not permit any data transfer between mobile computing device 120 and vehicle computing system 100. A charge-only connection may, in various cases, only enable electrical charging or discharging of mobile computing device 120 (e.g., by way of transferring electrical energy or power via cable 119). In these cases, mobile computing device 120 may output (e.g., at display device 122) a message suggesting that user 150 use a different cable (e.g., one that supports data communication), or connect cable 119 to a different port of vehicle computing system 100. In many cases, a vehicle computing system such as vehicle computing system 100 may provide various ports, all of which may enable electrical charging or discharging of mobile computing device 120. However, only one or more of these ports may support data communication.

Vehicle computing system 100 may include, but is not limited to, display device 112 and control unit 106. One or more components of vehicle computing system 100 may be directly and physically accessible to occupants seated in the front driver and front passenger seats of the automobile, and may be located within, near, or on a center console of the vehicle. Such components may be within easy reach of such occupants, and may also or alternatively be positioned in another passenger area of the vehicle, such as a back seat. In some examples, a component may be within easy reach if a vehicle occupant does not need to change positions in his or her seat in order to reach the component with an outstretched arm. Stated another way, for many drivers, for example, the usual positions of the steering wheel, stick shift, and center console may be considered within easy reach of the driver.

In some examples, one or more components of vehicle computing system 100 that might not necessarily require physical access by occupants of the vehicle (such as, in some examples, display device 112 and control unit 106), may be positioned in or on or integrated into dashboard 156. Such components may be integrated as part of an automobile dashboard and/or console facing or near the occupants of the vehicle. As further described in this disclosure, vehicle computing system 100 may include display 112 that may output a graphical user interface. In various examples, in-vehicle cameras may be mounted or otherwise connected to one or more portions or components of the vehicle shown in FIG. 1.

Seated on seat 152 is user 150. User 150 may be a driver, but user 150 could also be a passenger or other vehicle occupant. Although in FIG. 1 user 150 is shown in a position that may often be considered a front seat (characterized, e.g., by steering wheel 154 and dashboard 156), user 150 may be seated in another location within the vehicle, including a back seat.

In the example of FIG. 1, user 150 may navigate or operate the vehicle, may interact with one or more components of the vehicle, and/or may provide input at display device 112, which, in some cases, may comprise a presence-sensitive display device. User 150 may also interact with separate devices, such as one or more mobile computing devices. In FIG. 1, user 150 is shown interacting with mobile computing device 120.

As noted above, in some cases, display device 112 of vehicle computing system 100 may comprise a presence-sensitive display device that may detect one or more taps, gestures, and/or other user inputs at locations of display device 112. Such taps, gestures, or other inputs may be from one or more fingers of user 150, or may be from a stylus or other device used by user 150. In response to detecting input at display device 112, one or more application modules of vehicle computing system 100 may determine an operation corresponding to the input and/or perform an operation. In some examples, and in response to the information about the input, these application modules of vehicle computing system 100 may output, to display device 112, information about the input, the operation, or an operation to be performed.

As described and illustrated, some or all of vehicle computing system 100 may be housed within dashboard 156, which may in some examples be constructed of plastic, vinyl, rubber, aluminum, steel, or any other suitable material. Control unit 106 may include at least one processor and/or at least one storage device, and may be housed within housing 105, which may also be constructed of plastic, vinyl, rubber, aluminum, steel, or any other suitable material. In some examples, housing 105 may also be a rigid case that encloses and otherwise protects one or more electrical components that provide functionality for vehicle computing system 100. In some examples, housing 105 may be affixed, mounted or otherwise integrated with the automobile dashboard or console.

Control unit 106 may provide an operating environment or platform for one or one more modules, such as a combination of hardware, firmware, and software. For instance, control unit 106 may include one or more processors and storage devices that may execute instructions and store data of one or more modules. Control unit 106 may also be operably coupled to one or more other software and/or hardware components, including display device 112 to control, configure, and/or communicate information with the components, to name only a few example operations.

Display device 112 may function as an output device using any one or more of a liquid crystal display (LCD), dot matrix display, light emitting diode (LED) display, organic light-emitting diode (OLED) display, e-ink, or similar monochrome or color display capable of outputting visible information to a user or vehicle occupant. In some examples, display device 112 may also function as an input device, so that it serves as both an input and output device. In such examples, display device 112 may include an integrated presence-sensitive input device and a display device. For instance, display device 112 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Based on user input, display device 112 may present output to user 150. For instance, display device 112 may present various user interfaces of applications (e.g., a navigation application) executing at vehicle computing system 100. An occupant of the vehicle, such as user 150, may provide user input to interact with one or more of such applications.

In some examples, vehicle computing system 100 may be controlled through input detected by display device 112 and/or one or more additional input devices (e.g., microphones, physical buttons or switches, or other types of input devices). When communicatively coupled to mobile computing device 120 (e.g., via one or more wireless and/or wired connections), vehicle computing system 100 may also exchange data with mobile computing device 120, and may, in some cases, be controlled based on input received from mobile computing device 120.

In some cases, the vehicle shown in FIG. 1 may include one or more cameras that are attached to one or more components of the vehicle. These cameras may be one or more of any appropriate type of image acquisition or capture device, such as a camera or charge-coupled device. In some examples, in-vehicle cameras be one or more infrared cameras with a high field-of-view and shallow depth of focus, and may be a backlit infrared camera oriented to point generally upward within the vehicle, having a particular field-of-view. In other examples, in-vehicle cameras may be or may further include one or more other types of cameras or image sensors, which may include one or more other infrared cameras, thermographic cameras, thermal imaging cameras, light-sensitive cameras, range sensors, tomography devices, radar devices, red-green-blue (RGB) cameras, or ultrasonic cameras. In some examples, in-vehicle cameras may be any image capture device appropriate for application of computer vision techniques. Depending on the type of sensors or cameras used, the resulting image may include two-dimensional images, three-dimensional volumes, or an image sequence. Pixel values typically correspond to light intensity in one or more spectral bands, but might also be related to various physical measures, such as depth, absorption or reflectance of sonic or electromagnetic waves, or nuclear magnetic resonance. In-vehicle cameras may be configured to capture movements of an occupant of the vehicle, such as user 150, as the occupant moves an arm, wrist, hand, stylus, and/or fingers as he or she gestures in, for example, a field-of-view.

Vehicle computing system 100 may operate to assist, inform, entertain, or perform other tasks that require user interactions with occupants of a vehicle. As noted above, vehicle computing system 100 may, in some examples, be referred to as an infotainment head unit (IHU), an infotainment system, or a subcomponent thereof. For example, vehicle computing system 100 may execute one or more applications 110 that perform functions or process information, on behalf of one or more occupants of the vehicle.

Vehicle computing system 100 may include a user interface (UI) module 108. UI module 108 and applications 110 may perform operations described herein using software, hardware, firmware, or a mixture of both hardware, software, and firmware residing in and executing by vehicle computing system 100 or at one or more other remote computing devices. As such, UI module 108 and applications 110 may be implemented as hardware, software, and/or a combination of hardware and software. Vehicle computing system 100 may execute UI module 108, applications 110, or one or more other modules as or within a virtual machine executing on underlying hardware. UI module 108 and applications 110 may be implemented in various ways. For example, UI module 108 and applications 110 may be implemented as a downloadable or pre-installed application or "app." In another example, UI module 108 and applications 110 may be implemented as part of an operating system of vehicle computing system 100.

UI module 108 of vehicle computing system 100 may receive from display device 112 (e.g., when display device comprises a presence-sensitive device) one or more indications of user input detected at display device 112. Generally, each time display device detects user input at a particular location, UI module 108 may receive an indication of user input or information about the user input. UI module 108 may assemble the information received from display device 112 into a set of one or more events, such as a sequence of one or more touch events or gesture events. UI module 108 may determine one or more characteristics of the user input based on the sequence of gesture events and include information about these one or more characteristics within each gesture event in the sequence of gesture events. UI module 108 may transmit indications of user input from display device 112 to other modules, such as applications 110. UI module 108 may determine one or more single- or multi-touch gestures provided by a user. UI module 108 may also receive data from one or more applications 110 and cause display device 12 to output content, such as a graphical user interface, for display.

Applications 110 may include functionality to perform any variety of operations on vehicle computing system 100. For instance, applications 110 may include a navigation application, a weather application, a phone dialer application, an information retrieval application, a multimedia application, a vehicle information application, an email application, a text messaging application, an instant messaging application, a social networking application, a weather application, a stock market application, an emergency alert application, and/or a sports application, to name only a few examples. In general, vehicle computing system 100, whether through applications 110 or otherwise, may be configured to perform operations including those relating to climate control systems (e.g., heating and air conditioning), audio or infotainment systems, seat, window, sunshade, or windshield wipers, cruise control, in-cabin display system, steering wheel controls, headrest, arm rest, side or rear view mirrors, collision sensors. Such operations may be controlled by one or more applications 110, or may be controlled by other systems within the vehicle. In some examples, such operations may be limited to non-safety features of the vehicle. In other examples, such operations may encompass one or more features of the vehicle that may be considered safety-related (e.g., turning on a turn-signal, adjusting a mirror, adjusting or fastening/disconnecting a seat belt, adjusting cruise control features, accelerating, braking).

Although shown as operable within control unit 106 of vehicle computing system 100, one or more of applications 110 may be operable by a remote computing device (e.g., mobile computing device 120) that is communicatively coupled to vehicle computing system 100, such as via one or more wired and/or wireless connections. In such examples, an application module executing at a remote computing device may cause the remote computing device to send the content and intent information using any suitable form of data communication (e.g., wired or wireless network, short-range wireless communication such as Near Field Communication or BLUETOOTH, etc.). In some examples, a remote computing device may be a computing device that is separate from a computing device included in vehicle computing system 100. For instance, the remote computing device may be operatively coupled to vehicle computing system 100 by a network. An example of a remote computing device may include, but is not limited to a server, smartphone, tablet computing device, smart watch, a laptop, or a desktop computer. As shown in FIG. 1, one such example remote device is mobile computing device 120, which may include a presence-sensitive display device 122 and one or more communication units 146, and which may execute one or more applications 124 and a port manager 126. Examples of mobile computing device 120 may include, but are not limited to, a mobile phone, a tablet computer, a personal digital assistant (PDA), a laptop computer, a portable gaming device, a portable media player, an e-book reader, a wearable device (e.g., a watch, a wrist-mounted computing device, a head-mounted computing device), or other type of mobile computing device. For instance, FIG. 1 illustrates another example of such a remote computing device 107, which is a wearable device worn by user 150.

Figure 3:
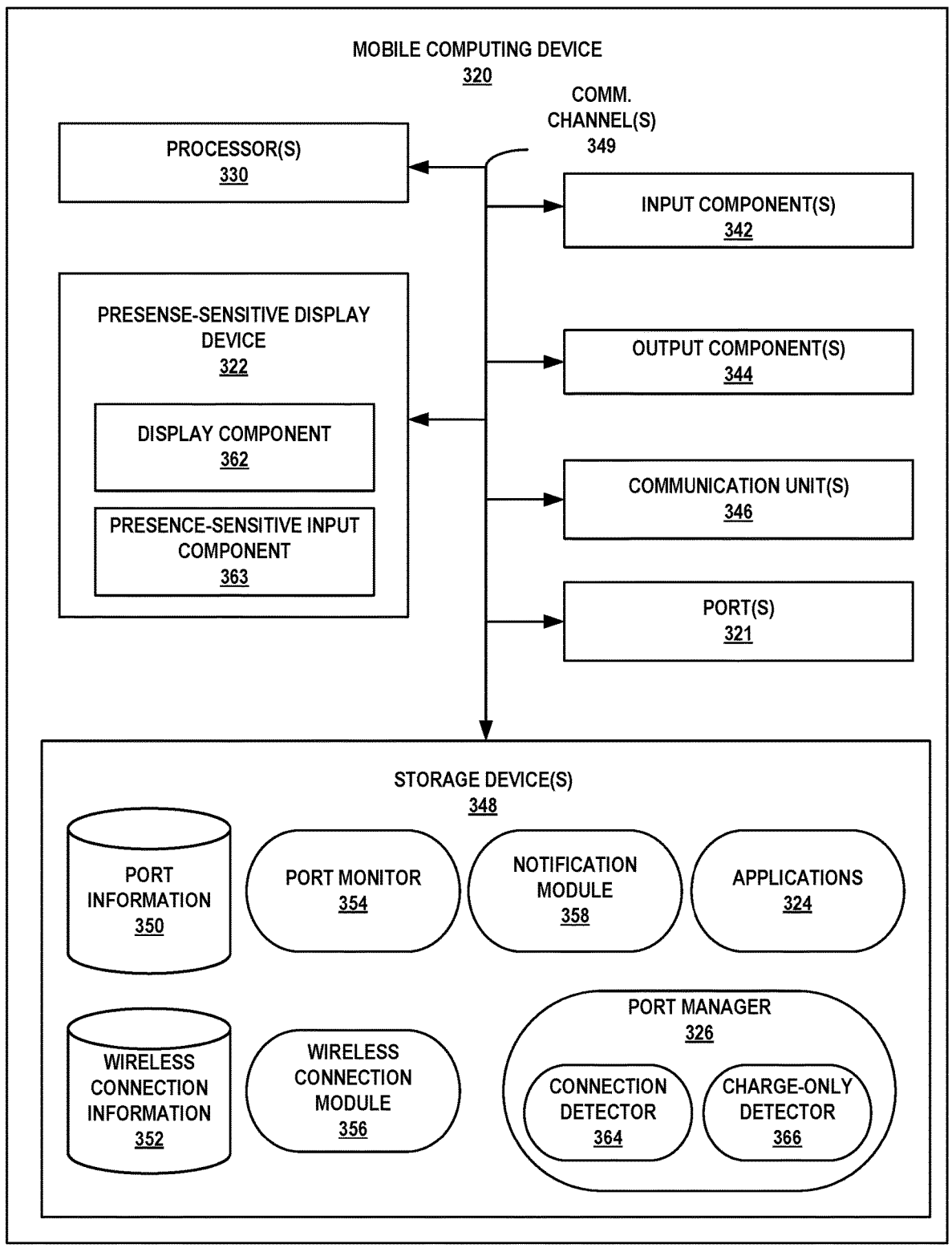
FIG. 3 is a block diagram illustrating further details of an example mobile computing device that is configured to detect a charge-only connection with a vehicle computing system, in accordance with one or more aspects of the present disclosure.

Mobile computing device 120 may be or include one or more processors, and may use communication units 146 (e.g., communication units 346 shown and described in reference to FIG. 3) to identify short-range wireless communication signals that are provided by or otherwise associated with vehicle computing system 100. Communication units 146 may, in various cases, establish one or more wired and/or wireless connections to vehicle computing system 100. Vehicle computing system 100 may similarly include one or more communication units 114. Vehicle computing system 100 may use communication units 114 to communicate with communication units 146 mobile computing device 120 using one or more wired protocols (e.g., Universal Serial Bus protocol) and/or wireless protocols (e.g., BLUETOOTH, WIFI, or BLUETOOTH Low Energy (BLE) protocols). When mobile computing device 120 is paired and otherwise connected to vehicle computing system 100, vehicle computing system 100 and mobile computing device 120 may exchange unique identifiers. For example, in some cases, upon identifying short-range wireless communication signals associated and/or establishing a short-range wireless connection with communication units 114 of vehicle computing system 100, communication units 146 of mobile computing device 120 may receive a unique identifier of vehicle computing system 100 from communication units 114 of vehicle computing system 100. Mobile computing device 120 may store and later compare this identifier to identify and/or authenticate vehicle computing system 100 at a later point in time at which mobile computing device 120 identifies further wireless signals from and/or establishes another connection to vehicle computing system 100.

As described above, mobile computing device 120 includes presence-sensitive display device 122 and communication units 146. Mobile computing device 120 also includes one or more applications 124 and a port manager 126, which are executable by one or more processors (not shown in FIG. 1) of mobile computing device 120. Further details of one example of mobile computing device 120 are shown in FIG. 3.

Similar to applications 110 of vehicle computing system 100, applications 124 of mobile computing device 120 may include functionality to perform any variety of operations on mobile computing device 120. For instance, applications 124 may include a navigation application, a weather application, a phone dialer application, an information retrieval application, a multimedia application, a vehicle information application, an email application, a text messaging application, an instant messaging application, a social networking application, a weather application, a stock market application, an emergency alert application, and/or a sports application, to name only a few examples. Port manager 126 may be another application executed by mobile computing device 120.

As described earlier, the present application describes techniques for detecting the presence of mobile computing device 120 (e.g., smartphone) within a vehicle, such as the vehicle indicated in FIG. 1, and for further determining whether mobile computing device 120 has established a charge-only connection, via electrical cable 119, with vehicle computing system 100 of the vehicle. As noted above, a charge-only connection may, in various cases, only enable electrical charging or discharging of mobile computing device 120 (e.g., by way of transferring electrical energy or power via cable 119). For example, once user 150 has entered the vehicle, the user's mobile computing device 120 may use its communication units 146 determine that mobile computing device is located within or in proximity to the vehicle based on a short-range wireless connection that communication units 146 establishes with one or more communication units 114 of vehicle computing system 100.

In many cases, user 150 may also wish to connect mobile computing device 120 with vehicle computing system 100, via electrical cable 119, in order for mobile computing device 120 to establish a data connection with vehicle computing system 100. If user 150 attaches electrical cable 119 from a port 121 (e.g., Universal Serial Bus, or USB) port of mobile computing device 120 to a port 115 of vehicle computing system 100, port manager 126 of mobile computing device 120 may be configured to monitor the status of port 121, and/or connections with port 121, to determine if mobile computing device 120 has established a charge-only connection, rather than a full data connection, with vehicle computing system 100. In this case, port manager 126 may output an error or control message, and may also output (e.g., at presence-sensitive display device 122 and/or 112) a recommendation that user 150 use a different type of cable or attach current cable 119 into a different port of vehicle computing system 100. Port 121 may be part of or communicatively coupled to communication units 146 of mobile computing device 120, and port 115 may be part of or communicatively coupled to communication units 114 of vehicle computing system 100. As shown in the example of FIG. 1, port 115 may be attached to dashboard 156 and/or display device 112 in some cases. In some cases, mobile computing device 120 may output error messages, notifications, and/or recommendations to vehicle computing system 100 (e.g., via one or more wireless connections between communication units 146 of mobile computing device 120 and communication units 114 of vehicle computing system 100). In these cases, vehicle computing system 100 may output received information for display at display device 112.

Accordingly, in one or more examples, and as described in further detail below, mobile computing device 120 may identify (e.g., using communication units 146 and/or a wireless connection module, such as wireless connection module 356 shown in FIG. 3) one or more short-range wireless communication signals associated with communication units 114 of vehicle computing system 100. Mobile computing device 120 may determine (e.g., using wireless connection module 356), based on the short-range wireless communication signals, that mobile computing device 120 is proximate to vehicle computing system 100. As described in further detail below, in various cases, mobile computing device 120 may determine that mobile computing device 120 is proximate to and/or inside the vehicle, based on identifying and/or authenticating vehicle computing system 100, after establishing a short-range wireless connection, such as, e.g., by confirming that vehicle computing system 100 sends a unique identifier of vehicle computing system 100 to mobile computing device 120, via the short-range wireless connection, which is the same identifier that was previously stored by mobile computing device 120 from a previously established connection (e.g., previously established wireless or wired connection) with vehicle computing system 100.

Responsive to determining that mobile computing device 120 is proximate to vehicle computing system 100, port manager 126 of mobile computing device 120 may identify an electrical connection between mobile computing device 120 and the vehicle (e.g., with vehicle computing system 100), where the electrical connection is provided by electrical cable 119 that connects port 121 of mobile computing device 120 to port 115 of the vehicle. In the example of FIG. 1, port 115 is part of or otherwise communicatively coupled to vehicle computing system 100. However, in certain cases, port 115 may not be part of vehicle computing system 100, but may comprise an electrical component that is attached to another portion of the vehicle, and which is configured to provide the electrical connection via electrical cable 119. In some cases, ports 121 and 115 may comprise USB ports, and electrical cable 119 may comprise a USB cable.

Port manager 126 may determine that the electrical connection is a charge-only connection that enables an electrical charging or discharging of mobile computing device 120 (e.g., by the vehicle or vehicle computing system 100), but that prohibits any data transfer between mobile computing device 120 and vehicle computing system 100. The charge-only connection may, in various cases, only enable electrical charging or discharging of mobile computing device 120 (e.g., by way of transferring electrical energy or power via cable 119). Port manager 126 and/or another application or module of mobile computing device 120 may output a notification (e.g., for display at presence-sensitive display device 122 of mobile computing device 120 and/or at display device 112 of vehicle computing system 100 via the short-range wireless connection), which is indicative of the charge-only connection. For example, the notification may alert user 150 of the error condition, and may provide a suggestion for user 150 (e.g., such as shown in FIGS. 5A-5B) to either use a different cable or to attach electrical cable 119 to a different port of vehicle computing system 100. In such fashion, the techniques disclosed herein may enable more accurate and reliable determination as to when an established connection between mobile computing device 120 and vehicle computing system 100 is a charge-only connection, as opposed to a data connection that communicates data according to one or more protocols (e.g., USB protocol). The disclosed techniques may also help improve telemetry for connections (e.g., USB connections) and improve the user experience associated with any connectivity issues, including issues with charge-only cables and/or charge-only ports being used with vehicle computing system 100, and/or any issues associated with potential defects in or malfunctions of data cables or ports that fail to provide data connections.

In certain other examples, mobile computing device 120 may be able to detect a charge-only connection, rather than a full data connection, with devices other than vehicles such as the one illustrated in FIG. 1. For instance, in some cases, mobile computing device 120 may be able to detect a charge-only connection, such as described herein, with one or more devices in a peer-to-peer communications network, where mobile computing device 120 comprises one of the peer devices or nodes, and wherein another peer device or node in the network is communicatively coupled to mobile computing device 120 via one or more wired or wireless connections (e.g., via cable 119).

Figure 2:
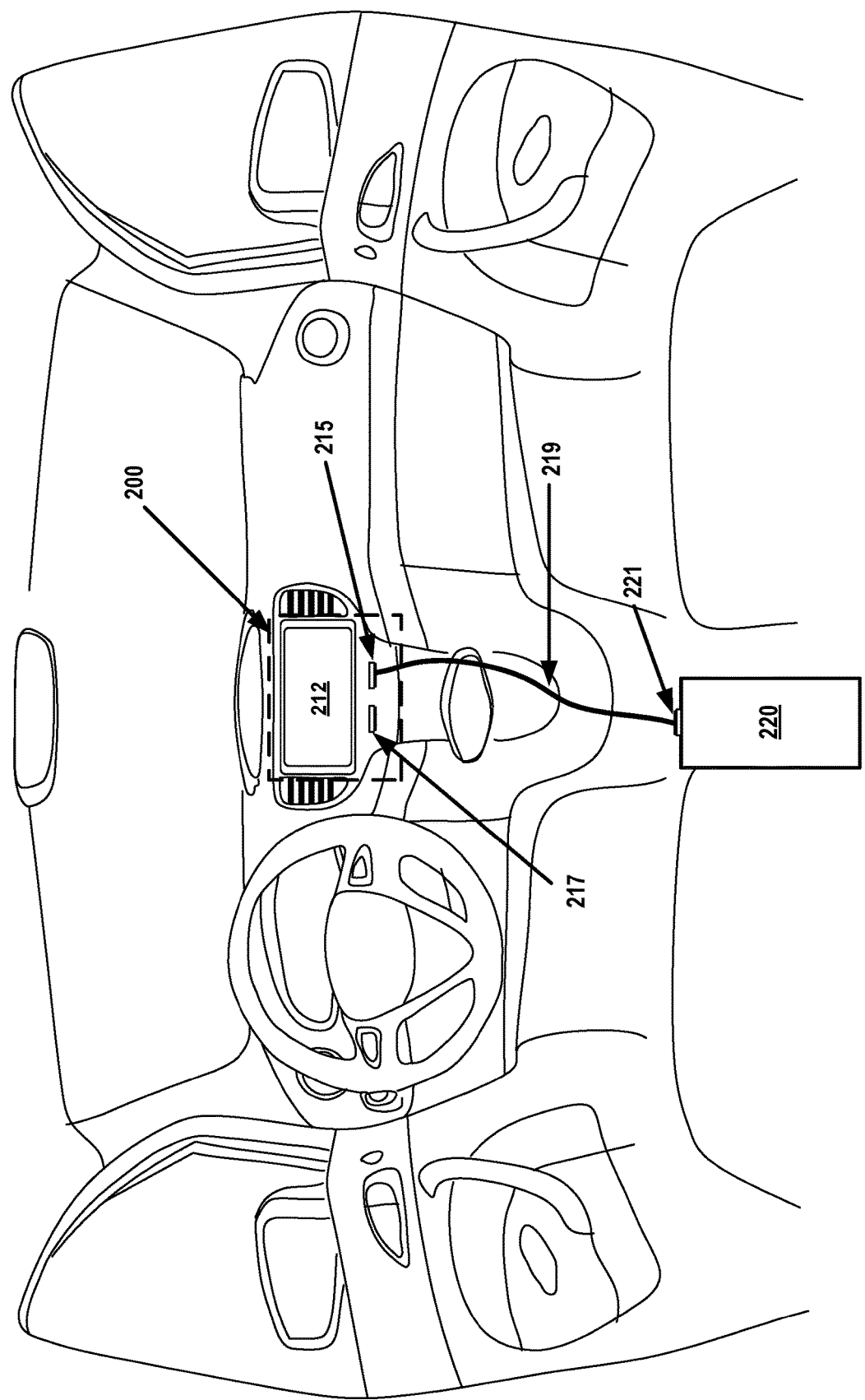
FIG. 2 is a conceptual diagram illustrating a front view of an interior of a vehicle in which an example mobile computing device is configured to detect a charge-only connection with an example vehicle computing system, in accordance with one or more aspects of the present disclosure.

FIG. 2 is a conceptual diagram illustrating a front view of an interior of a vehicle in which an example mobile computing device 220 is configured to detect a charge-only connection with an example vehicle computing system 200, in accordance with one or more aspects of the present disclosure. The vehicle indicated in FIG. 2 may be one example of the vehicle indicated in FIG. 1, where mobile computing device 220 is one example of mobile computing device 120, and where vehicle computing system 200 is one example of vehicle computing system 100. FIG. 2 illustrates a more complete view of the interior of such a vehicle in which mobile computing device 220 may be used.

Vehicle computing system 200 includes, among other things, a presence-sensitive display device 212, a first port 215 (e.g., first USB port), and a second port 217 (e.g., second USB port). Mobile computing device 220 includes a port 221 (e.g., USB port). Similar to the description above in reference to FIG. 1, mobile computing device 220 may identify short-range wireless communication signals associated with vehicle computing system 200. Mobile computing device 220 may determine, based on the short-range wireless communication signals, that mobile computing device 220 is proximate to vehicle computing system 200.

Responsive to determining that mobile computing device 220 is proximate to vehicle computing system 200, mobile computing device 220 may identify an electrical connection between mobile computing device 220 and vehicle computing system 200, where the electrical connection is provided by electrical cable 219 that connects port 221 of mobile computing device 220 to first port 215 of vehicle computing system 200. Mobile computing device 220 may then determine that the electrical connection is a charge-only connection that enables an electrical charging or discharging of mobile computing device 220 by vehicle computing system 200, but that prohibits any data transfer between mobile computing device 220 and vehicle computing system 200. Mobile computing device 220 may then output a notification (e.g., for display at mobile computing device 220 and/or at presence-sensitive display device 212) indicative of the charge-only connection, such as an error notification, and/or a notification suggestion that a user either use a different cable or to attach electrical cable 219 to a different port of vehicle computing system 200 (e.g., to second port 217 of vehicle computing system). In many cases, a vehicle computing system such as vehicle computing system 200 may provide various ports (e.g., ports 215, 217), all of which may enable electrical charging or discharging of mobile computing device 220 via cable 219. However, only one or more of these ports 215, 217 may support data communication.

As one non-limiting example, cable 219 may comprise a USB cable, and each of ports 215, 217 and 221 may comprise USB ports. In certain cases, a data USB cable, which is capable of supporting data transfer between endpoints includes four lines: a power supply line, a ground line, and two data communication lines (e.g., positive and negative voltage data lines). Similarly, in these cases, a data USB port has connectors for the power supply line, the ground line, and the two data communication lines. (In other cases, a data USB cable and/or port may have more than four lines or connectors.) A charge-only USB cable, however, typically only includes the power supply and ground lines, and a charge-only USB port has connectors only for the power supply and ground lines. Mobile computing device 220 may be configured to determine that the electrical connection is a charge-only connection by determining that the electrical connection supports or provides only the power supply and ground lines, to enable electrical charging or discharging of mobile computing device 220, but that the electrical connection does not support or provide the two additional data communication lines. As a result, the charge-only connection prohibits any data transfer between mobile computing device 220 and vehicle computing system 200. In other examples, cable 219 may comprise another form of cable (e.g., Ethernet cable), and ports 215, 217, and 221 may comprise other forms of ports (e.g., Ethernet ports).

FIG. 3 is a block diagram illustrating an example mobile computing device 320 that is configured to detect a charge-only connecting with a vehicle computing system, in accordance with one or more aspects of the present disclosure. Mobile computing device 320 may, in some cases, be a more detailed example of mobile computing device 120 of FIG. 1 and/or mobile computing device 220 of FIG. 2. In some cases, mobile computing device 320 may be an example of wearable device 107 shown in FIG. 1. FIG. 3 illustrates only one particular example of mobile computing device 320, and many other examples of mobile computing device 320 may be used in other instances and may include a subset of the components or additional components not shown in FIG. 3.

As shown in the example of FIG. 3, mobile computing device 320 includes presence-sensitive display device 322, one or more processors 330, one or more input components 342, one or more output components 344, one or more communication units 346, one or more ports 321, and one or more storage devices 348. In some examples, ports 321 may be part of, included in, or otherwise coupled to communication units 346. Communication channels 349 may interconnect each of the components 322, 330, 342, 344, 346, 321 and/or 348 for inter-component communications (physically, communicatively, and/or operatively). In some examples, communication channels 349 may include a system bus, a network connection, one or more inter-process communication data structures, or any other components for communicating data (also referred to as information).

One or more communication units 346 of mobile computing device 320 may communicate with external devices by transmitting and/or receiving data. For example, mobile computing device 320 may use one or more of communication units 346 to transmit and/or receive radio signals on a radio network such as a cellular radio network. In some examples, communication units 346 may transmit and/or receive satellite signals on a satellite network such as a Global Positioning System (GPS) network. Examples of communication units 346 include a network interface card (e.g. such as an Ethernet card), an optical transceiver, an interface controller (e.g., USB controller), a radio frequency transceiver, a GPS receiver, or any other type of device that can send and/or receive information. Other examples of communication units 346 may include short wave radios (e.g., NFC, BLUETOOTH (including BLE)), GPS, 3G, 4G, 5G, and WIFI radios found in mobile devices). Communication units 346 may enable wired and/or wireless communication with mobile computing device 320, including short-range wireless communication (e.g., BLUETOOTH). Mobile computing device 320 also includes one or more ports 321 (e.g., one or more USB ports), which may be one example of port 121 shown in FIG. 1. Ports 321 may be part of, included in, or otherwise coupled to communication units 346.

One or more input components 342 of mobile computing device 320 may receive input. Examples of input are tactile, audio, kinetic, and optical input, to name only a few examples. Input components 342 of mobile computing device 320 include, in one example, a mouse, keyboard, voice responsive system, video camera, buttons, control pad, microphone or any other type of device for detecting input from a human or machine. In some examples, input component 342 may be a presence-sensitive input component, which may include a presence-sensitive screen, touch-sensitive screen, etc.

One or more output components 344 of mobile computing device 320 may generate output. Examples of output are tactile, audio, and video output. Output components 344 of mobile computing device 320, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, presence-sensitive display device 322 of mobile computing device 320 may include functionality of input components 342 and/or output components 344. In the example of FIG. 3, presence-sensitive display device 322 may include a presence-sensitive input component 363, such as a presence-sensitive screen or touch-sensitive screen. In some examples, presence-sensitive input component 363 may detect an object at and/or near the presence-sensitive input component. As one example range, presence-sensitive input component 363 may detect an object, such as a finger or stylus that is within two inches or less of presence-sensitive input component 363. Presence-sensitive input component 363 may determine a location (e.g., an (x,y) coordinate) of the presence-sensitive input component at which the object was detected. In another example range, presence-sensitive input component 363 may detect an object two inches or less from presence-sensitive input component 363 and other ranges are also possible. Presence-sensitive input component 363 may determine the location of presence-sensitive input component 363 selected by a user's finger using capacitive, inductive, and/or optical recognition techniques.

In some examples, presence-sensitive display device 322 may also provide output to a user using tactile, audio, or video stimuli as described with respect to output components 344. For instance, presence-sensitive display device 322 may include display component 362 that displays a graphical user interface. Display component 362 may be any type of output component that provides visual output, such as described with respect to output components 344. While illustrated as an integrated component of mobile computing device 320, presence-sensitive display device 322 may, in some examples, be an external component that shares a data or information path with other components of mobile computing device 320 for transmitting and/or receiving input and output. For instance, presence-sensitive display device 322 may be a built-in component of mobile computing device 320 located within and physically connected to the external packaging of mobile computing device 320 (e.g., a screen on a mobile phone). In another example, presence-sensitive display device 322 may be an external component of mobile computing device 320 located outside and physically separated from the packaging of mobile computing device 320 (e.g., a monitor, a projector, etc. that shares a wired and/or wireless data path with a tablet computer). In some examples, presence-sensitive display device 322, when located outside of and physically separated from the packaging of mobile computing device 320, may be implemented by two separate components: a presence-sensitive input component 363 for receiving input and a display component 362 for providing output.

One or more storage devices 348 within mobile computing device 320 may store information for processing during operation of mobile computing device 320. In some examples, storage devices 348 include a temporary memory, meaning that a primary purpose of storage devices 348 is not long-term storage. Storage devices 348 on mobile computing device 320 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 348, in some examples, also include one or more computer-readable storage media. Storage devices 348 in some examples include one or more non-transitory computer-readable storage mediums. Storage devices 348 may be configured to store larger amounts of information than typically stored by volatile memory. Storage devices 348 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EE-PROM) memories.

One or more processors 330 may implement functionality and/or execute instructions associated with mobile computing device 320. Examples of processors 330 include application processors, display controllers, auxiliary processors, one or more sensor hubs, and any other hardware configure to function as a processor, a processing unit, or a processing device.

In certain examples, where mobile computing device 320 comprises an example of mobile computing device 120 (FIG. 1) and/or 220 (FIG. 2), processors 330 of mobile computing device 320 may retrieve and execute instructions stored by storage devices 348 that cause processors 330 to perform any of the operations described herein. The instructions, when executed by processors 330, may cause mobile computing device 320 to store information within storage devices 348, including, as appropriate, within data stores 350 and/or 352.

As shown in FIG. 3, storage devices 348 may store instructions and/or data associated with various different components. For example, as illustrated in FIG. 3, storage devices 348 may store a port manager 326 (e.g., one example of port manager 126 shown in FIG. 1), a port monitor 354, a notification module 358, one or more applications 324 (e.g., an example of applications 124), and a wireless connection module 356. In certain examples, any one or more of port manager 326, port monitor 354, notification module 358, applications 360, and/or wireless connection module 356 may be included and/or executed as standalone, integrated, or operating system units. Storage devices 348 also store a port information data store ("port information 350") and a wireless connection information data store ("wireless connection information 352").

Figure 4:
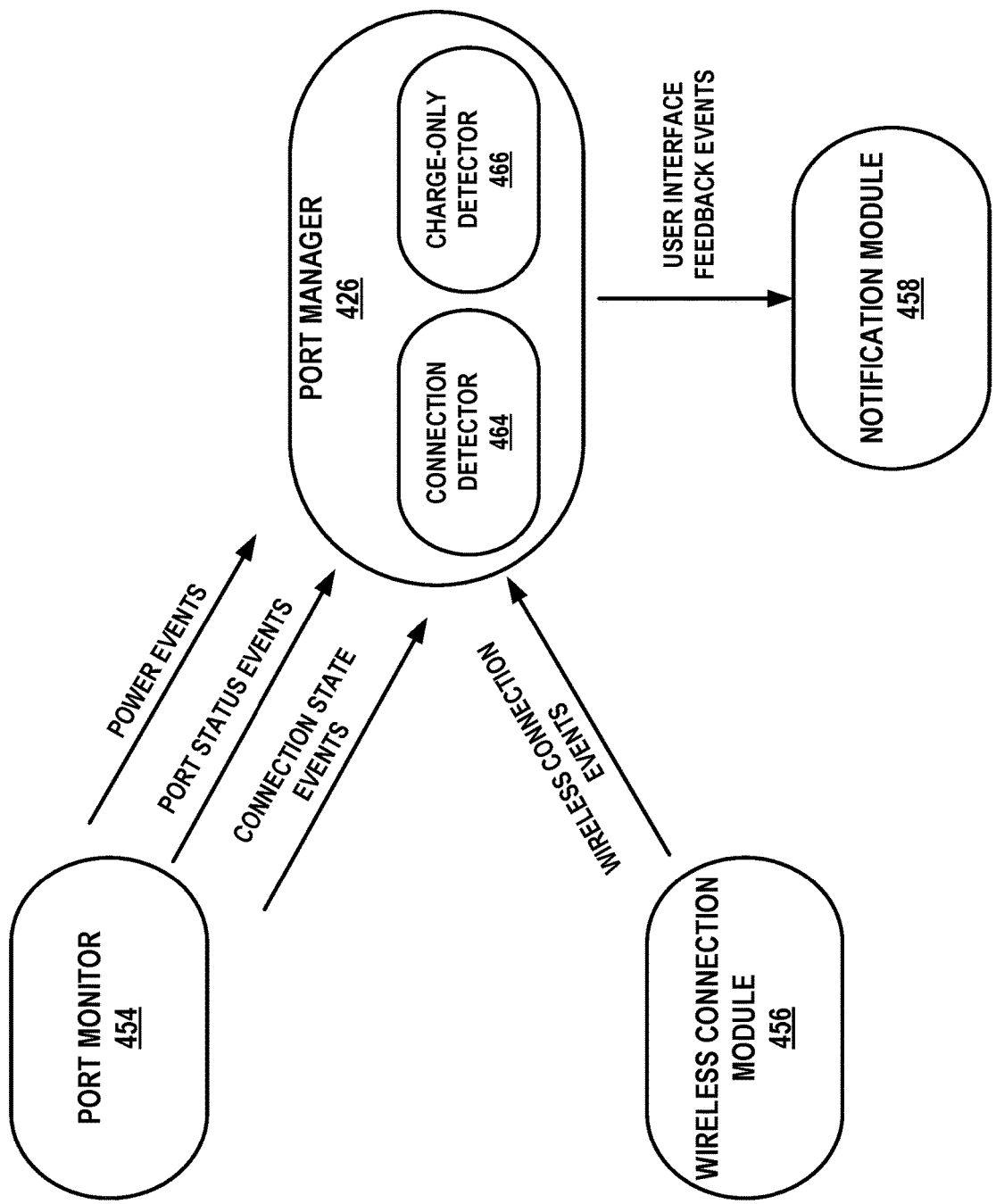
FIG. 4 is a block diagram illustrating example interactions between various modules that are executable by a mobile computing device, in accordance with one or more aspects of the present disclosure.

As described in further detail in reference to FIG. 4, port monitor 354 and wireless connection module 356 may be configured to monitor for various conditions or general status indications during operation of mobile computing device 320. For example, port monitor 354 may be configured to monitor for power conditions, port status conditions, and/or connection conditions that are associated with mobile computing device 320, including port 321, and may generate corresponding events for processing by port manager 326, as indicated in the example of FIG. 4. Port monitor 354 may store any such monitored information in port information 350, which may be associated with port 321.

Wireless connection module 356 may be configured to monitor and/or control wireless connection events and/or operations for mobile computing device 320. Wireless connection module 356 may, in various cases, establish one or more wireless connections with one or more external devices or system. Wireless connection module 356 may store any information associated these connections, including previously established connections, within wireless connection information 352. For example, wireless connection module 356 may store the unique identifiers of any external devices or systems with which it has established a wireless connection, as well as any other information associated with these connections (e.g., connection identifiers, protocol identifiers, port identifiers, connection passwords or keys, timestamps, pairing information, and the like). In certain alternate examples, port monitor 354 and/or port manager 326 may store similar types of information in port information 350 based on previously established wired connections between ports 321 and the vehicle computing system.

In one example, as described previously, mobile computing device 320 may use wireless connection module 356 to identify short-range wireless communication signals associated with a vehicle computing system of a vehicle, and may establish a short-range wireless connection with the vehicle computing system, such as vehicle computing system 100 (FIG. 1) and/or 200 (FIG. 2). Wireless connection module 356 may receive connection information from the vehicle computing system, including a unique identifier (e.g., BLUETOOTH identifier) of the vehicle computing system. Wireless connection module 356 may determine, based on the short-range wireless communication signals and/or established connection, that mobile computing device 320 is proximate to the vehicle computing system (e.g., that mobile computing device 320 is located or present inside the vehicle associated with the vehicle computing system, such as the vehicle of FIG. 1 or FIG. 2). In various examples, wireless connection module 356 may output data, control messages, error codes, notifications, or other information to the vehicle computing system using the established short-range wireless connection upon determining the presence of a charge-only connection, as described herein. The vehicle computing system may then output any received information for display to a user of the vehicle.

Wireless connection module 356 may, in various examples, authenticate the vehicle computing system based on the unique identifier it receives from the vehicle computing system and/or other information associated with the connection. Wireless connection module 356 may determine that mobile computing device 320 is inside the vehicle occurs responsive to authenticating the vehicle computing system. For instance, wireless connection module 356 may have previously established a wireless connection with the same vehicle computing system at an earlier point in time (e.g., when an owner of mobile computing device 320 previously used the vehicle), and wireless connection module 356 may have stored the unique identifier of the vehicle computing system in wireless connection information 352. (In alternate examples, port monitor 354 and/or port manager 326 may have previously used ports 321 to establish one or more wired connections with the vehicle computing system, and may have stored a unique identifier of the vehicle computing system in port information 350.) Wireless connection module 356 may store any other information associated with the previously established connection in wireless connection information 352 (e.g., connection identifiers, protocol identifiers, port identifiers, connection passwords or keys, timestamps, pairing information, and the like).

When wireless connection module 356 establishes a new or current wireless connection with the vehicle computing system, and receives the identifier from vehicle computing system, it may compare the received identifier with the previously stored unique identifier of the vehicle computing system, which may be stored in wireless connection information 352 and/or port information 350. Upon determining a match, wireless connection module 356 may be able to authenticate the vehicle computing system. In some cases, wireless connection module 356 may perform authentication based upon one or more factors, such as confirming the unique identifier of the vehicle computing system, confirming a successful pairing of devices, confirming connection passwords or keys, confirming wireless network or connection names/identifiers, and the like.

After wireless connection module 356 determines that mobile computing device 320 is inside or otherwise proximate to the vehicle, port manager 326 may identify an electrical connection between mobile computing device 320 and the vehicle computing system. For example, as shown in FIG. 3, port manager 326 includes a connection detector 364 that is configured to identify such an electrical connection. This electrical connection may be provided by an electrical cable (e.g., cable 119 of FIG. 1 and/or cable 219 of FIG. 2), which connects port 321 of mobile computing device 320 to a port (e.g., port 115 of FIG. 1, port 215 of FIG. 2) of the vehicle computing system. In some cases, prior to identifying the electrical connection, but responsive to determining that mobile computing device 320 is proximate to the vehicle computing system (e.g., inside the vehicle), port manager 326 and/or notification module 358 may output, for display at presence-sensitive display device 322, an instructional message for a user (see, e.g., FIG. 5A) to attach an electrical cable from port 321 of mobile computing device 320 to the port of the vehicle computing system.

In various cases, connection detector 364 may identify such an electrical connection based upon events that are generated and provided to connection detector 364 by port monitor 354. As noted above, port monitor 354 may be configured to monitor for various conditions or general status indications during operation of mobile computing device 320. For example, port monitor 354 may be configured to monitor for power conditions, port status conditions, and/or connection conditions that are associated with mobile computing device 320, including port 321, and may generate corresponding events or signals for processing by port manager 326. Port monitor 354 may, for instance, generate a power event or signal indicating that mobile computing device 320 is receiving power and/or being electrically charged via port 321. Port monitor 354 may also generate a port status event or signal indicating that port 321 is connected to an external system. Upon receiving one or more of these events or signals from port monitor 354, connection detector 364 may identify the presence of an electrical connection between mobile computing device 320 and an external system. Connection detector 364 may determine that the electrical connection exists (e.g., via an electrical cable) between port 321 and a port of the vehicle computing system recently identified and authenticated by wireless connection module 356, as described above.

Port manager 326 also includes a charge-only detector 366. After connection detector 364 identifies the electrical connection, charge-only detector 366 may be configured to determine that the electrical connection is a charge-only connection. A charge-only connection is one that enables an electrical charging or discharging of mobile computing device 320 (e.g., by way of transferring electrical energy or power via a cable), but that prohibits any data transfer between mobile computing device 320 and the vehicle computing system. For example, similar to the description provided in reference to FIG. 2, mobile computing device 320 may be configured to determine that the electrical connection is a charge-only connection by determining that the electrical connection supports or provides only the power supply and ground lines to mobile computing device 320 via port 321, to enable electrical charging or discharging of mobile computing device 320, but that the electrical connection does not support or provide the two additional data communication lines. As a result, the charge-only connection prohibits any data transfer between mobile computing device 320 and the vehicle computing system.

Connection detector 364 and/or charge-only detector 366 may store any connection and/or detection information within port information 350, which may be associated with port 321. In identifying the charge-only connection, charge-only detector 366 may determine that the electrical cable connected to port 321 is a charge-only cable and/or that the port of the vehicle computing system, which is communicatively coupled to port 321 via the cable, is a charge-only port. In some cases, as further described in reference to FIG. 4 below, charge-only detector 366 may periodically monitor (e.g., every 100 milliseconds) a state of port 321 and/or any connections with port 321, where the state is associated with the electrical connection provided by the electrical cable that is connected to port 321. In these cases, charge-only detector 366 may determine, based on the monitored state of the connection and/or of port 321, that no data can be transmitted to or received from the vehicle computing system via the electrical connection.

Charge-only detector 366 and/or notification module 358 may also be configured to output a notification indicative of the charge-only connection. For example, notification module 358 may output the notification for display at presence-sensitive display device 322 (see, e.g., FIG. 5B). In some cases, notification module 358 may also use wireless connection module 356 to output the notification to the vehicle computing system via the established short-range wireless connection. In these cases, the vehicle computing system may also display the notification (e.g., at display device 112), which is indicative of the charge-only connection.

In various examples, such as illustrated in FIG. 5B, notification module 358 may output the notification as an error message that indicates the charge-only connection. In certain cases, notification module 358 may also output a message to suggest at least one of (i) plugging the electrical cable into a different port of the vehicle computing system, or (ii) using a different electrical cable in connecting port 321 of mobile computing device 320 to the port of the vehicle computing system.

In various cases, one or more ports 321 may include a Universal Serial Bus (USB) port. In these cases, the USB port of ports 321 is connected, via a USB cable, to a USB port of the vehicle computing system (e.g., port 115 in FIG. 1, port 215 or 217 in FIG. 2). However, in certain instances, one or more of the USB cable and/or the USB port of the vehicle computing system may provide or support a charge-only connection.

FIG. 4 is a block diagram illustrating example interactions between various modules that are executable by a mobile computing device, such as mobile computing device 120 (FIG. 1), 220 (FIG. 2), and/or 320 (FIG. 3), in accordance with one or more aspects of the present disclosure. For purposes of illustration only, FIG. 4 will be described in reference to mobile computing device 320 of FIG. 3.

FIG. 4 includes a port monitor 454 (e.g., one example of port monitor 354), wireless connection module 456 (e.g., one example of wireless connection module 356), port manager 426 (e.g., one example of port manager 326), and notification module 458 (e.g., one example of notification module 358). As outlined earlier in reference to FIG. 3, port monitor 454 and wireless connection module 456 may be configured to monitor for various conditions or general status indications during operation of mobile computing device 320. For example, port monitor 454 may be configured to monitor for power conditions, port status conditions, and/or connection conditions that are associated with mobile computing device 320, including port 321, and may generate corresponding events for processing by port manager 426. For instance, port monitor 454 may generate one or more power events (e.g., an event when power is connected for electrical charging or discharging of port 321, an event when power is disconnected) associated with monitored conditions for port 321, and may provide these events (e.g., via a push or pull model) to port manager 426 for further processing, as indicated in FIG. 4. Port monitor 454 may generate one or more port status events associated with a low-level port status of port 321, and/or may generate higher-level connection state events that are associated with a current status of any connections to port 321 (e.g., connections from port 321 with a vehicle computing system). Port monitor 454 may also provide these events to port manager 426 for further processing. For example, the higher-level connection state events may indicate whether or not a connection with port 321 exists and/or whether the connection is configured for data transfer according to one or more protocols (e.g., data transfer via a USB protocol). Port monitor 454 is therefore configured to monitor for power conditions, port status conditions, and/or connection conditions that are associated with port 321, and to generate corresponding events for processing by port manager 426. Port manager 426 uses its connection detector 464 and charge-only detector 466 to process such telemetry information associated with port 321 and any connections associated with port 321.

Wireless connection module 456 may be configured to monitor and/or control wireless connection events and/or operations for mobile computing device 320. Wireless connection module 456 may, in various cases, establish one or more wireless connections with one or more external devices or system. Wireless connection module 456 may store the unique identifiers of any external devices or systems with which it has established a wireless connection, as well as any other information associated with these connections (e.g., connection identifiers, protocol identifiers, port identifiers, connection passwords or keys, timestamps, pairing information, and the like). In certain alternate examples, port monitor 454 and/or port manager 426 may store similar types of information (e.g., in port information 350) based on previously established wired connections between, e.g., ports 321 and the vehicle computing system.

In one example, mobile computing device 320 may use wireless connection module 456 to establish a short-range wireless connection with a vehicle computing system of a vehicle, such as vehicle computing system 100 (FIG. 1) and/or 200 (FIG. 2). Wireless connection module 456 may receive connection information from the vehicle computing system, including a unique identifier (e.g., BLUETOOTH identifier) of the vehicle computing system. Wireless connection module 456 may determine, based on the short-range wireless connection, that mobile computing device 320 is proximate to (e.g., inside of) the vehicle associated with the vehicle computing system, such as the vehicle of FIG. 1 or FIG. 2.

Wireless connection module 456 may, in various examples, authenticate the vehicle computing system based on the unique identifier it receives from the vehicle computing system and/or other information associated with the connection. Wireless connection module 456 may determine that mobile computing device 320 is inside the vehicle occurs responsive to authenticating the vehicle computing system. For instance, wireless connection module 456 may have previously established a wireless connection with the same vehicle computing system at an earlier point in time (e.g., when an owner of mobile computing device 320 previously used the vehicle), and wireless connection module 456 may have stored the unique identifier of the vehicle computing system, as well as other information associated with the previously established connection (e.g., connection identifiers, protocol identifiers, port identifiers, connection passwords or keys, timestamps, pairing information, and the like). When wireless connection module 456 establishes a new or current wireless connection with the vehicle computing system, and receives the identifier from vehicle computing system, it may compare the received identifier with the unique identifier of the vehicle computing system that it previously received. Upon determining a match, wireless connection module 456 may be able to authenticate the vehicle computing system. In some cases, wireless connection module 456 may perform authentication based upon one or more factors, such as confirming the unique identifier of the vehicle computing system, confirming a successful pairing of devices, confirming connection passwords or keys, confirming network and/or connections identifiers, and the like.

Upon wireless connection module 456 determining that mobile computing device 320 has established a short-range wireless connection with a vehicle computing system and/or that it is located inside the vehicle, wireless connection module 456 may generate one or more corresponding wireless connection events that may be provided to port manager 426 (e.g., via a push or pull model), as indicated in FIG. 4. For example, upon receiving one or more of such events from wireless connection module 456, connection detector 464 of port manager 426 may attempt to identify an electrical connection between mobile computing device 320 and the vehicle computing system. This electrical connection may be provided by an electrical cable (e.g., cable 119 of FIG. 1 and/or cable 219 of FIG. 2), which that connects port 321 of mobile computing device 320 to a port (e.g., port 115 of FIG. 1, port 215 of FIG. 2) of the vehicle computing system. In some examples, prior to attempting to identify an electrical connection, connection detector 464 may provide one or more user interface feedback events for processing by notification module 458. For instance, connection detector 464 may generate one or more events that cause notification module 458 to output (e.g., at presence-sensitive display device 322) information indicating that a short-range wireless connection has been established, and suggesting that a user attach a cable from port 321 to a port of the vehicle computing system (see, e.g., FIG. 5A).

In various cases, connection detector 464 may identify such an electrical connection based upon events that are generated and provided to connection detector 364 by port monitor 454. For example, similar to the description above in reference to FIG. 3, port monitor 454 may generate a power event or signal indicating that mobile computing device 320 is receiving power and/or being electrically charged via port 321 (e.g., power connected), and/or port monitor 354 may generate a port status event or signal indicating that port 321 is connected (e.g., connected state) to an external system.

Upon receiving one or more of these events or signals from port monitor 454, connection detector 464 may identify the presence of an electrical connection between mobile computing device 320 and an external system. Connection detector 464 may determine that the electrical connection exists (e.g., via an electrical cable) between port 321 and a port of the vehicle computing system recently identified and authenticated by wireless connection module 456, as described above.

Port manager 426 also includes a charge-only detector 466. After connection detector 464 identifies the electrical connection, charge-only detector 466 may be configured to determine that the electrical connection is a charge-only connection. As described previously, a charge-only connection is one that enables an electrical charging or discharging of mobile computing device 320 but prohibits any data transfer between mobile computing device 320 and the vehicle computing system. To determine whether or not a charge-only connection exists for port 321, charge-only detector may monitor the status of connection state events that are provided by port monitor 454. These events may indicate the general, current status of any connections with port 321, such as whether these connections are connected and/or configured for data transfer (e.g., data transfer according to a communication protocol, such as the USB protocol).

If charge-only detector 466 receives connection state event information from port monitor 454 indicating that an identified electrical connection to port 321 is connected but not configured for data transfer, charge-only detector 466 may determine that the identified connection is a charge-only connection. If, however, the state event information indicates that the identified connection is connected and configured for data transfer (e.g., with a vehicle computing system), charge-only detector 466 may determine that the identified connection is a data connection. In some cases, charge-only detector 466 may periodically monitor (e.g., once every 100 milliseconds) a state of port 321 and/or any connections with port 321, based on the processing of connection state events from port monitor 454. In these cases, based on the monitored state, if charge-only detector 466 identifies a data connection, rather than a charge-only connection, charge-only detector 466 may lower the frequency of connection monitoring (e.g., only once every second), to reduce the use of system resources by port monitor 454 and/or port manager 426. However, according to some examples, even in these cases, charge-only detector 466 may continue to process events provided by port monitor 454 on a regular basis, in order to identify any changes in the status of power, port status, and/or connection conditions associated with port 321 over time.

If, at any point in time, charge-only detector 466 identifies a charge-only connection, charge-only detector 466 may determine that the electrical cable connected to port 321 is a charge-only cable and/or that the port of the vehicle computing system, which is communicatively coupled to port 321 via the cable, is a charge-only port. Charge-only detector 466 may then generate one or more user interface feedback events (e.g., error messages), which are indicative of the charge-only connection, for processing by notification module 458. However, in some examples, before generating these events, charge-only detector 466 may first start a configurable timer (e.g., 5000 milliseconds) once it has identified the charge-only connection condition. Upon expiration of the timer (e.g., a threshold period of time after determining the charge-only connection), if charge-only detector 466 continues to identify the charge-only condition, it may then generate the one or more interface feedback events, indicative of the charge-only connection, which it provides to notification module 458. The use of such a timer may, in some cases, reduce potential hysteresis or false-positive detection by charge-only detector 466.

Upon receiving events generated by charge-only detector 466 that are indicative of the charge-only connection, notification module 458 may output a notification that indicates the charge-only connection for display at presence-sensitive display device 322 (see, e.g., FIG. 5B). In various examples, such as shown in FIG. 5B, notification module 358 may output the notification as an error message that indicates the charge-only connection. In addition, in certain cases, notification module 358 may output a message to suggest at least one of (i) plugging the electrical cable into a different port of the vehicle computing system, or (ii) using a different electrical cable in connecting port 321 of mobile computing device 320 to the port of the vehicle computing system.

FIGS. 5A-5B are screen diagrams illustrating example displays that may be output by a mobile computing device and/or a vehicle computing system, such as mobile computing device 320 and/or vehicle computing system 100/200, in accordance with one or more aspects of the present disclosure. For purposes of illustration only in the description below, the screen diagrams shown in FIGS. 5A-5B are output by a mobile computing device. As outlined above, prior to identifying an electrical connection, but responsive to determining that mobile computing device 320 is proximate to the vehicle computing system (e.g., inside a vehicle), connection detector 464 may output one or more user interface events to notification module 458 indicating that a short-range wireless connection has been established, and suggesting that a user connect a cable to port 321. Upon receive of these one or more events, notification module 458 may output corresponding notifications (e.g., for display at presence-sensitive display device 322).

FIG. 5A illustrates an example of one such notification. This notification includes an informational message indicating that a short-range wireless connection between mobile computing device 320 and the car has been established. The notification further includes an instructional message, in the form of a suggested action for the user, to attach an electrical cable from port 321 (e.g., a USB port) of mobile computing device 320 to a port (e.g., USB port) of the vehicle computing system.

FIG. 5B illustrates an example of a notification associated with a detected charge-only connection. As described above, such as in reference to FIG. 4, charge-only detector 466 may provide one or more events for processing by notification module 458 that are indicative of a charge-only connection. In response to receive such events, notification module 458 may output one or more corresponding notifications, such as shown in FIG. 5B, which may be displayed at presence-sensitive display device 322. The notification of FIG. 5B includes an error message indicating that such a charge-only connection has been detected, and that mobile computing device 320 is unable to establish a data connection with the car. The notification further includes an instruction message, in the form of a suggested action for the user, to perform one or more of the following actions: (i) plugging the electrical cable into a different port of the vehicle computing system, and/or (ii) using a different electrical cable in connecting port 321 of mobile computing device 320 to the port of the vehicle computing system.

Figure 6:
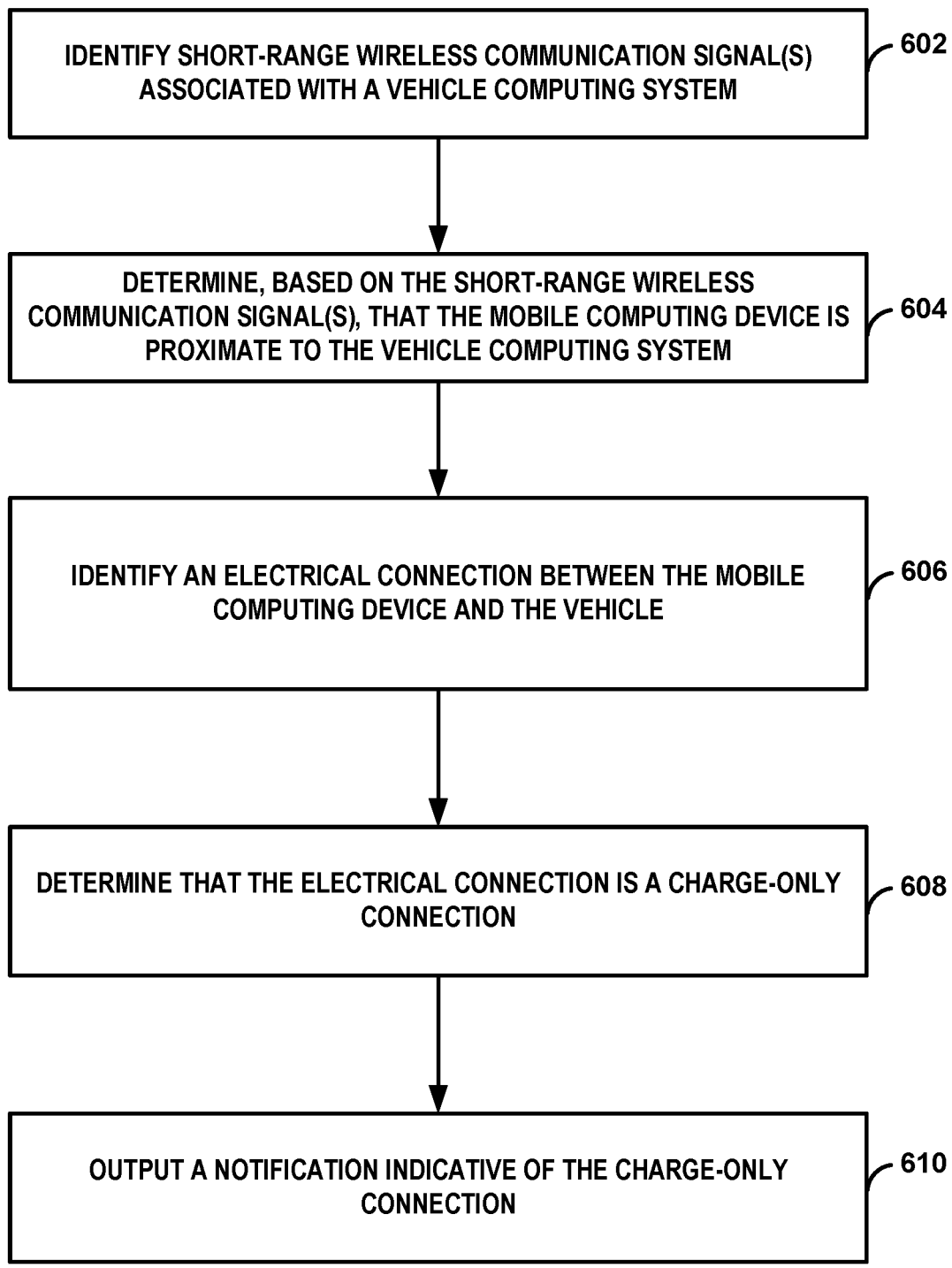
FIG. 6 is a flowchart illustrating example operations performed by a mobile computing device, in accordance with one or more aspects of the present disclosure.

FIG. 6 is a flowchart illustrating example process performed by an example mobile computing device, in accordance with one or more aspects of the present disclosure. For example, the process illustrated in FIG. 6 may be performed by mobile computing device 120 (FIG. 1), mobile computing device 220 (FIG. 2), and/or mobile computing device 320 (FIG. 3). For purposes of illustration only, the process of FIG. 6 will be described in reference to operations performed by mobile computing device 320.

Mobile computing device 320 may use wireless connection module 356 to identify (602) one or more short-range wireless communication signals that are associated with a vehicle computing system (e.g., vehicle computing system 100) of a vehicle. Wireless connection module 356 may determine (604), based on the short-range wireless communication signals, that mobile computing device 320 is proximate to the vehicle computing system. Responsive to the determination that mobile computing device 320 is proximate to the vehicle computing system, port manager 326 may use connection detector 364 to identify (606) an electrical connection between mobile computing device 320 and the vehicle. The electrical connection may be provided by an electrical cable (e.g., cable 119 of FIG. 1, cable 219 of FIG. 2) that connects a port of mobile computing device 320 to a port of the vehicle. Charge-only detector 366 may determine (608) that the electrical connection is a charge-only connection, where the charge-only connection enables an electrical charging or discharging of mobile computing device 320 but prohibits any data transfer between mobile computing device 320 and the vehicle computing system. Notification module 358 may output (610) a notification indicative of the charge-only connection.

The following examples are provided for purposes of illustration only.

Example 1

A method comprising: identifying, by a mobile computing device, one or more short-range wireless communication signals that are associated with a vehicle computing system of a vehicle; determining, by the mobile computing device, based on the one or more short-range wireless communication signals, that the mobile computing device is proximate to the vehicle computing system; responsive to determining that the mobile computing device is proximate to the vehicle computing system, identifying, by the mobile computing device, an electrical connection between the mobile computing device and the vehicle, wherein the electrical connection is provided by an electrical cable that connects a port of the mobile computing device to a port of the vehicle; determining, by the mobile computing device, whether the electrical connection is a charge-only connection, wherein the charge-only connection enables an electrical charging or discharging of the mobile computing device but prohibits any data transfer between the mobile computing device and the vehicle computing system; and, responsive to determining that the electrical connection is the charge-only connection, outputting, by the mobile computing device, a notification indicative of the charge-only connection.

Example 2

The method of Example 1, further comprising: after identifying the one or more short-range wireless communication signals, establishing, by the mobile computing device, a short-range wireless connection with the vehicle computing system of the vehicle; receiving, by the mobile computing device via the short-range wireless connection with the vehicle computing system, a unique identifier of the vehicle computing system; and identifying, by the mobile computing device based on the unique identifier, the vehicle computing system, wherein determining that the mobile computing device is proximate to the vehicle computing system occurs responsive to the mobile computing device identifying the vehicle computing system.

Example 3

The method of any of Examples 1-2, wherein determining that the electrical connection is the charge-only connection comprises: periodically monitoring, by the mobile computing device, a state of the electrical connection provided by the electrical cable that connects the port of the mobile computing device to the port of the vehicle; and determining, by the mobile computing device, based on the state of the electrical connection, that no data can be transmitted to or received from the vehicle computing system via the electrical connection.

Example 4

The method of any of Examples 1-3, wherein the port of the vehicle comprises a port of the vehicle computing system, and wherein identifying the electrical connection between the mobile computing device and the vehicle comprises one or more of: determining, by the mobile computing device, that the mobile computing device is electrically charging or discharging via the electrical connection provided by the electrical cable that connects the port of the mobile computing device to the port of the vehicle computing system; or determining, by the mobile computing device, that a status of the port of the mobile computing device indicates the electrical connection to the port of the vehicle computing system via the electrical cable.

Example 5

The method of any of Examples 1-4, wherein the port of the mobile computing device comprises a Universal Serial Bus (USB) port of the mobile computing device, wherein the port of the vehicle comprises a USB port of the vehicle computing system, and wherein the electrical cable comprises a USB cable.

Example 6

The method of any of Examples 1-5, wherein determining that the electrical connection is a charge-only connection comprises determining, by the mobile computing device, at least one of (i) that the port of the vehicle is a charge-only port; or (ii) that the electrical cable is a charge-only cable.

Example 7

The method of any of Examples 1-6, wherein outputting the notification indicative of the charge-only connection comprises outputting, by the mobile computing device and for display a threshold period of time after determining that the electrical connection is the charge-only connection, an error message indicative of the charge-only connection.

Example 8

The method of any of Examples 1-7, wherein outputting the notification indicative of the charge-only connection comprises outputting, by the mobile computing device and for display, a message to suggest at least one of (i) plugging the electrical cable into a different port of the vehicle computing system, or (ii) using a different electrical cable in connecting the port of the mobile computing device to the port of the vehicle.

Example 9

The method of any of Examples 1-8, wherein outputting the notification indicative of the charge-only connection comprises sending, by the mobile computing device and to the vehicle computing system via the short-range wireless connection, data that is indicative of the charge-only connection.

Example 10

The method of any of Examples 1-9, further comprising: responsive to determining that the mobile computing device is proximate to the vehicle computing system, and before identifying the electrical connection between the mobile computing device and the vehicle, outputting, by the mobile computing device and for display, an instructional message to attach the electrical cable from the port of mobile computing device to the port of the vehicle.

Example 11

The method of any of Examples 1-10, further comprising: responsive to determining that the electrical connection is a data connection rather than a charge-only connection, sending, by the mobile computing device and to the vehicle computing system via the data connection, application data for display at the vehicle computing system.

Example 12

A mobile computing device, comprising: at least one processor; and at least one computer-readable storage device storing instructions that, when executed by the at least one processor, cause the at least one processor to: identify one or more short-range wireless communication signals that are associated with a vehicle computing system of a vehicle; determine, based on the one or more short-range wireless communication signals, that the mobile computing device is proximate to the vehicle computing system; responsive to determining that the mobile computing device is proximate to the vehicle computing system, identify an electrical connection between the mobile computing device and the vehicle, wherein the electrical connection is provided by an electrical cable that connects a port of the mobile computing device to a port of the vehicle; determine whether the electrical connection is a charge-only connection, wherein the charge-only connection enables an electrical charging or discharging of the mobile computing device but prohibits any data transfer between the mobile computing device and the vehicle computing system; and responsive to determining that the electrical connection is the charge-only connection, output a notification indicative of the charge-only connection.

Example 13

The mobile computing device of Example 12, wherein the instructions stored on the at least one computer-readable storage device further cause the at least one processor to perform the method of any of Examples 1-11.

Example 14

A mobile computing device comprising means for performing the method of any of Examples 1-11.

Example 15

A computer-readable storage medium storing instructions that, when executed by at least one processor, cause the at least one processor of a mobile computing device to perform operations comprising: identifying one or more short-range wireless communication signals that are associated with a vehicle computing system of a vehicle; determining, based on the one or more short-range wireless communication signals, that the mobile computing device is proximate to the vehicle computing system; responsive to determining that the mobile computing device is proximate to the vehicle computing system, identifying an electrical connection between the mobile computing device and the vehicle, wherein the electrical connection is provided by an electrical cable that connects a port of the mobile computing device to a port of the vehicle; determining whether the electrical connection is a charge-only connection, wherein the charge-only connection enables an electrical charging or discharging of the mobile computing device but prohibits any data transfer between the mobile computing device and the vehicle computing system; and responsive to determining that the electrical connection is the charge-only connection, outputting a notification indicative of the charge-only connection.

Example 16

The computer-readable storage medium of Example 15, wherein the instructions cause the at least one processor of the mobile computing device to perform the method of any of Examples 1-11.

In one or more examples, the functions described may be implemented in hardware, hardware and software, hardware and firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
identifying, by a mobile computing device, one or more short-range wireless communication signals that are associated with a vehicle computing system of a vehicle;
determining, by the mobile computing device, based on the one or more short-range wireless communication signals, that the mobile computing device is proximate to the vehicle computing system;
responsive to determining that the mobile computing device is proximate to the vehicle computing system, identifying, by the mobile computing device, an electrical connection between the mobile computing device and the vehicle, wherein the electrical connection is provided by an electrical cable that connects a port of the mobile computing device to a port of the vehicle;
determining, by the mobile computing device, whether the electrical connection is a charge-only connection, wherein the charge-only connection enables an electrical charging or discharging of the mobile computing device but prohibits any data transfer between the mobile computing device and the vehicle computing system; and
responsive to determining that the electrical connection is the charge-only connection, outputting, by the mobile computing device, a notification indicative of the charge-only connection.

2. The method of claim 1, further comprising:
after identifying the one or more short-range wireless communication signals, establishing, by the mobile computing device, a short-range wireless connection with the vehicle computing system of the vehicle;
receiving, by the mobile computing device via the short-range wireless connection with the vehicle computing system, a unique identifier of the vehicle computing system; and
identifying, by the mobile computing device based on the unique identifier, the vehicle computing system,
wherein determining that the mobile computing device is proximate to the vehicle computing system occurs responsive to the mobile computing device identifying the vehicle computing system.

3. The method of claim 1, wherein determining that the electrical connection is the charge-only connection comprises:
periodically monitoring, by the mobile computing device, a state of the electrical connection provided by the electrical cable that connects the port of the mobile computing device to the port of the vehicle; and
determining, by the mobile computing device, based on the state of the electrical connection, that no data can be transmitted to or received from the vehicle computing system via the electrical connection.

4. The method of claim 1, wherein the port of the vehicle comprises a port of the vehicle computing system, and wherein identifying the electrical connection between the mobile computing device and the vehicle comprises one or more of:
determining, by the mobile computing device, that the mobile computing device is electrically charging or discharging via the electrical connection provided by the electrical cable that connects the port of the mobile computing device to the port of the vehicle computing system; or
determining, by the mobile computing device, that a status of the port of the mobile computing device indicates the electrical connection to the port of the vehicle computing system via the electrical cable.

5. The method of claim 1,
wherein the port of the mobile computing device comprises a Universal Serial Bus (USB) port of the mobile computing device,
wherein the port of the vehicle comprises a USB port of the vehicle computing system, and
wherein the electrical cable comprises a USB cable.

6. The method of claim 1, wherein determining that the electrical connection is a charge-only connection comprises determining, by the mobile computing device, at least one of (i) that the port of the vehicle is a charge-only port; or (ii) that the electrical cable is a charge-only cable.

7. The method of claim 1, wherein outputting the notification indicative of the charge-only connection comprises outputting, by the mobile computing device and after a threshold period of time after determining that the electrical connection is the charge-only connection has elapsed, an error message indicative of the charge-only connection.

8. The method of claim 1, wherein the port of the vehicle comprises a port of the vehicle computing system, and wherein outputting the notification indicative of the charge-only connection comprises outputting, by the mobile computing device and for display, a message to suggest at least one of (i) plugging the electrical cable into a different port of the vehicle computing system, or (ii) using a different electrical cable in connecting the port of the mobile computing device to the port of the vehicle.

9. The method of claim 1, wherein outputting the notification indicative of the charge-only connection comprises sending, by the mobile computing device and to the vehicle computing system via a short-range wireless connection, data that is indicative of the charge-only connection.

10. The method of claim 1, further comprising:
responsive to determining that the mobile computing device is proximate to the vehicle computing system, and before identifying the electrical connection between the mobile computing device and the vehicle, outputting, by the mobile computing device and for display, an instructional message to attach the electrical cable from the port of mobile computing device to the port of the vehicle.

11. The method of claim 1, further comprising:
responsive to determining that the electrical connection is a data connection rather than a charge-only connection, sending, by the mobile computing device and to the vehicle computing system via the data connection, application data for display at the vehicle computing system.

12. A mobile computing device, comprising:
at least one processor; and
at least one computer-readable storage device storing instructions that, when executed by the at least one processor, cause the at least one processor to:
identify one or more short-range wireless communication signals that are associated with a vehicle computing system of a vehicle;

determine, based on the one or more short-range wireless communication signals, that the mobile computing device is proximate to the vehicle computing system;

responsive to determining that the mobile computing device is proximate to the vehicle computing system, identify an electrical connection between the mobile computing device and the vehicle, wherein the electrical connection is provided by an electrical cable that connects a port of the mobile computing device to a port of the vehicle;

determine whether the electrical connection is a charge-only connection, wherein the charge-only connection enables an electrical charging or discharging of the mobile computing device but prohibits any data transfer between the mobile computing device and the vehicle computing system; and responsive to determining that the electrical connection is the charge-only connection, output a notification indicative of the charge-only connection.

13. The mobile computing device of claim 12, wherein the instructions stored on the at least one computer-readable storage device further cause the at least one processor to:

after identifying the one or more short-range wireless communication signals, establish a short-range wireless connection with the vehicle computing system of the vehicle;

receive, via the short-range wireless connection with the vehicle computing system, a unique identifier of the vehicle computing system; and identify, based on the unique identifier, the vehicle computing system, wherein the instructions stored on the at least one computer-readable storage device cause the at least one processor to determine that the mobile computing device is proximate to the vehicle computing system in response to the mobile computing device identifying the vehicle computing system.

14. The mobile computing device of claim 12, wherein the instructions stored on the at least one computer-readable storage device that cause the at least one processor to determine that the electrical connection is the charge-only connection further cause the at least one processor to:

periodically monitor a state of the electrical connection provided by the electrical cable that connects the port of the mobile computing device to the port of the vehicle; and determine, based on the state of the electrical connection, that no data can be transmitted to or received from the vehicle computing system via the electrical connection.

15. The mobile computing device of claim 12, wherein the port of the vehicle comprises a port of the vehicle computing system, and wherein the instructions stored on the at least one computer-readable storage device that cause the at least one processor to identify the electrical connection between the mobile computing device and the vehicle further cause the at least one processor to at least one of:

determine that the mobile computing device is electrically charging or discharging via the electrical connection provided by the electrical cable that connects the port of the mobile computing device to the port of the vehicle computing system; or determine that a status of the port of the mobile computing device indicates the electrical connection to the port of the vehicle computing system via the electrical cable.

16. The mobile computing device of claim 12, wherein the port of the mobile computing device comprises a Universal Serial Bus (USB) port of the mobile computing device, wherein the port of the vehicle comprises a USB port of the vehicle computing system, and wherein the electrical cable comprises a USB cable.

17. The mobile computing device of claim 12, wherein the instructions stored on the at least one computer-readable storage device that cause the at least one processor to determine that the electrical connection is a charge-only connection further cause the at least one processor to determine at least one of (i) that the port of the vehicle is a charge-only port; or (ii) that the electrical cable is a charge-only cable.

18. The mobile computing device of claim 12, wherein the port of the vehicle comprises a port of the vehicle computing system, and wherein the instructions stored on the at least one computer-readable storage device that cause the at least one processor to output the notification indicative of the charge-only connection further cause the at least one processor to output, for display, a message to suggest at least one of (i) plugging the electrical cable into a different port of the vehicle computing system, or (ii) using a different electrical cable in connecting the port of the mobile computing device to the port of the vehicle.

19. The mobile computing device of claim 12, wherein the instructions stored on the at least one computer-readable storage device further cause the at least one processor to:

responsive to determining that the mobile computing device is proximate to the vehicle computing system, and before identifying the electrical connection between the mobile computing device and the vehicle, output, for display, an instructional message to attach the electrical cable from the port of mobile computing device to the port of the vehicle.

20. A non-transitory computer-readable storage medium storing instructions that, when executed by at least one processor, cause the at least one processor of a mobile computing device to perform operations comprising:

identifying one or more short-range wireless communication signals that are associated with a vehicle computing system of a vehicle;

determining, based on the one or more short-range wireless communication signals, that the mobile computing device is proximate to the vehicle computing system;

responsive to determining that the mobile computing device is proximate to the vehicle computing system, identifying an electrical connection between the mobile computing device and the vehicle, wherein the electrical connection is provided by an electrical cable that connects a port of the mobile computing device to a port of the vehicle;

determining whether the electrical connection is a charge-only connection, wherein the charge-only connection enables an electrical charging or discharging of the mobile computing device but prohibits any data transfer between the mobile computing device and the vehicle computing system; and responsive to determining that the electrical connection is the charge-only connection, outputting a notification indicative of the charge-only connection.

* * * * *